(12) United States Patent
Mackrle et al.

(10) Patent No.: US 7,303,686 B2
(45) Date of Patent: *Dec. 4, 2007

(54) METHOD OF SEPARATING SUSPENSION, IN PARTICULAR FOR WASTE WATER TREATMENT, AND AN APPARATUS FOR PERFORMING THE SAME

(76) Inventors: Svatopluk Mackrle, Pavlikova 5, 602 00 Brno (CZ); Vladimir Mackrle, Medvedovej 2700/21, 850 00 Bratislava-Petrzalka (CZ); Oldrich Dracka, Lipova 25, 602 00 Brno (CZ)

( * ) Notice: Subject to any disclaimer, the term of this patent is extended or adjusted under 35 U.S.C. 154(b) by 0 days.

This patent is subject to a terminal disclaimer.

(21) Appl. No.: 11/441,185

(22) Filed: May 26, 2006

(65) Prior Publication Data
US 2007/0056891 A1    Mar. 15, 2007

Related U.S. Application Data

(62) Division of application No. 10/477,411, filed as application No. PCT/CZ02/00027 on May 7, 2002, now Pat. No. 7,087,175.

(30) Foreign Application Priority Data
May 15, 2001    (CZ) .......................... PV 2001-1697

(51) Int. Cl.
    *C02F 1/52*    (2006.01)
(52) U.S. Cl. ...................... 210/715; 210/617; 210/713; 210/197; 210/205; 210/220; 210/521
(58) Field of Classification Search ................. 210/207
    See application file for complete search history.

(56) References Cited

U.S. PATENT DOCUMENTS 2,245,589 A * 6/1941 Hughes ...................... 210/715
2,272,026 A * 2/1942 Spaulding ................... 210/715
2,366,898 A * 1/1945 Brewster .................... 210/208
2,411,386 A * 11/1946 Parker et al. ............... 210/197
2,527,788 A * 10/1950 Bieker et al. ............... 210/197

(Continued)

FOREIGN PATENT DOCUMENTS

| CA | 769 769 | 10/1967 |
| CA | 921 626 | 2/1973 |
| CA | 1 038 090 | 9/1978 |
| CZ | 88 634 | 1/1959 |
| CZ | 123 929 | 3/1968 |

(Continued)

OTHER PUBLICATIONS

International Search Report, dated Oct. 15, 2002, 3 pages.

(Continued)

*Primary Examiner*—Peter A. Hruskoci
(74) *Attorney, Agent, or Firm*—Smith, Gambrell & Russell LLP

(57) ABSTRACT

Arrangement for separating suspension, in particular for treatment of wastewater. A flocculating suspension is separated from the liquid by filtration in a fluidized layer in a sludge blanket, wherein the flocks are created from the separated suspension and fluidization is maintained by the rising stream of liquid while liquid with suspension enters the fluidized layer from the bottom and the liquid freed from suspension is discharged above the surface of the sludge blanket represented by the interface between the fluidized layer and the liquid without suspension. Thickened separated suspension in the form of flocks from a sludge blanket is withdrawn from a zone of the fluidized layer the velocity of upward flow in the fluidized layer decreasing in the upward direction.

23 Claims, 9 Drawing Sheets

U.S. PATENT DOCUMENTS

| | | | |
|---|---|---|---|
| 3,403,096 A | | 9/1968 | Mackrle et al. |
| 3,523,889 A | * | 8/1970 | Eis .............................. 210/713 |
| 3,524,810 A | * | 8/1970 | Mackrle et al. ............. 210/715 |
| 3,627,136 A | * | 12/1971 | Mackrle et al. ............. 210/191 |
| 4,008,153 A | * | 2/1977 | Mackrle et al. ............. 210/208 |
| 4,146,471 A | * | 3/1979 | Wyness ....................... 210/715 |
| 5,032,276 A | * | 7/1991 | Mackrle et al. ............. 210/629 |
| 5,124,034 A | * | 6/1992 | Maness ................... 210/195.3 |
| 5,720,876 A | * | 2/1998 | Mackrle et al. ............. 210/197 |
| 5,755,966 A | | 5/1998 | Mackrle et al. |
| 6,358,407 B1 | * | 3/2002 | Liao et al. .................... 210/97 |
| 6,531,058 B1 | * | 3/2003 | Josse et al. ................. 210/151 |

FOREIGN PATENT DOCUMENTS

| | | |
|---|---|---|
| CZ | 159811 | 9/1975 |
| CZ | 173 893 | 8/1978 |
| CZ | 275 746 | 3/1992 |
| DE | 24 56 953 | 6/1975 |
| EP | 345 669 | 12/1989 |
| EP | 1 023 117 B1 | 8/2000 |
| FR | 7 439 337 | 12/1974 |
| JP | 1 0 44 405 | 2/1998 |
| WO | WO 98/51626 | 11/1995 |
| WO | WO 99/11353 | 3/1999 |

OTHER PUBLICATIONS

Patent Abstract of Japan, vol. 011, No. 018, 61-192391, published Aug. 26, 1986, Ebara Infilco Co. Ltd.

Patent Abstract of Japan, vol. 005, No. 058, 56010394, published Feb. 2, 1981, Toyo Giken KK; others.

Klyachko, V.A., "Purification of Natural Water," Moscow, Stroyizdat Publishers, 1971, p. 182.

* cited by examiner

METHOD OF SEPARATING SUSPENSION, IN PARTICULAR FOR WASTE WATER TREATMENT, AND AN APPARATUS FOR PERFORMING THE SAME

RELATED APPLICATION

This application is a division of U.S. application Ser. No. 10/477,411 filed Apr. 15, 2005, now issued as U.S. Pat. No. 7,087,175, which is a 371 U.S. National Phase of PCT/CZ02/00027 filed May 7, 2002.

BACKGROUND AND SUMMARY

The invention relates to a method of separating suspension, in particular for treatment of waste water, wherein the flocculating suspension is separated from the liquid by filtration in a fluidized layer in a sludge blanket wherein the flocks are created from the separated suspension and the fluidized state is maintained by the rising stream of liquid, while the liquid with suspension enters the fluidized layer from the bottom and the liquid freed from suspension is discharged above the surface of the sludge blanket represented by the interface between the fluidized layer and the liquid without suspension. Further it relates to an apparatus for performing this method containing an upward widening separator that is provided with the inlet of liquid with suspension in its bottom part, and a means for withdrawal of liquid without suspension in its upper part.

One of the most advanced methods for the separation of flocculating suspension during the purification and treatment of water is fluid filtration in a sludge blanket. The sludge blanket consists of a fluidized layer of flocks that are created by agglomeration of particles of the separated suspension. Water with suspension to be removed enters the sludge blanket by upward streaming. This flow sustains the layer of flocks in fluidized condition. During the throughflow of water with suspension through the fluidized layer the particles of suspension contact flocks with following capturing of suspension particles due to their adhesion to the flocks. This filtration relieves water from suspension that is transformed into flocks that are substantially larger than the inflowing suspension particles.

The fluidized layer creates a top interface between the fluidized layer and the liquid without suspension, the so-called surface of sludge blanket, the liquid freed from separated suspension being withdrawn above the surface of sludge blanket. The interface is established, if the flow velocity of liquid directly above the interface is lower than the velocity of not retarded sedimentation of separate particles creating the fluidized layer. Since the flocks created in the sludge blanket by agglomeration of suspension are substantially larger than the particles of inflowing suspension, this velocity substantially exceeds the sedimentation velocity of the separated suspension. The withdrawal of clear liquid shall be sufficiently spaced from the surface of sludge blanket, for preventing flocks from being dragged out of the sludge blanket due to irregularities of withdrawal. Due to that a layer of clear liquid in the separation zone above the sludge blanket is always indispensable.

The fluidized layer shall be supported from the bottom. A frequently used method of supporting the fluidized layer is hydrodynamic support consisting in that the quick flow of liquid under the fluid layer prevents its fall down. In such case the flow velocity of liquid in the fluidized layer decreases in upward direction.

A sludge blanket with flocks created by flocculating suspension is characterized by dynamic balance determining the size of flocks at the given spot. By catching particles of suspension and by agglomeration the single flocks grow, whereas large flocks are desintegrated to smaller ones under the influence of hydrodynamic forces. The fluidized layer for its part affects the liquid flow, thus establishing feedback.

The continuous interception of the suspension results in the increase of the total volume of flocks and, accordingly, the superfluous flocks should be removed from the sludge blanket. Thus the separated suspension is withdrawn from the sludge blanket in form of excess flocks.

Two types of sludge blankets are known: the fully fluidized one, specified also as perfectly fluidized, and the partially fluidized one, specified also as imperfectly fluidized. They differ as to the velocity of liquid at the surface of the sludge blanket and as to the type of withdrawal of excess flocks. In a partially fluidized sludge blanket the velocity of liquid at the surface of the sludge blanket is smaller than the limit of fluidization and the excess flocks are withdrawn from the bottom, in a fully fluidized sludge blanket the velocity of liquid at the surface of the sludge blanket exceeds the limit of fluidization and the excess flocks are withdrawn from the surface of the sludge blanket.

Due to the fact that the velocity of liquid tends to be slower than the fluidization limit at the surface of the partially fluidized sludge blanket, failures of fluidization are encountered there. Large agglomerations of flocks are created that fall down through the fluidized layer. Their falling down leads to rising currents in the vicinity, thus increasing the local velocity of upward flow, which contributes to the maintaining of fluidization in other zones close to the sludge blanket surface. Since the average velocity of the upward flow in a fluidized layer increases in the downward direction, some agglomerates are decomposed in the quicker flow and their flocks return back to the sludge blanket. Some agglomerates, however, fall through under the fluidized layer wherefrom they are removed. Within a certain range of parameters a balance is achieved between the amount of suspension flowing into the sludge blanket and the amount of suspension falling out of the sludge blanket and withdrawn by way of the described mechanism. If the amount of incoming suspension exceeds the amount of suspension that falls out, the volume of the sludge blanket increases, and if it exceeds the capacity of the plant, the sludge blanket starts being washed away into the withdrawal of purified water, i.e., it flows over. If the amount of incoming suspension is smaller than the amount of the suspension falling out, the volume of sludge blanket decreases, and if it drops under a critical value, the sludge blanket drops under the separator or, in other words, it falls out of the separation space.

The concentration of flocks in the sludge blanket depends upon the velocity of the upward flow. The lower is the flow velocity the higher is the concentration. The concentration of flocks in the agglomerates falling out of a partially fluidized sludge blanket is higher than what would correspond to the velocity of fluidization limit. That is why the concentration of separated suspension removed from a partially fluidized sludge blanket can be higher than the concentration of a suspension removed from a fully fluidized sludge blanket. On the other hand, however, the flow velocity at the surface of the sludge blanket and, accordingly, the hydraulic performance of a fully fluidized sludge blanket is higher than that of a partially fluidized sludge blanket. That is why the use of fully fluidized sludge blanket is favorable for the separation of diluted suspensions, whereas the partially fluidized sludge blanket is suitable for separating concentrated suspensions.

For this reason the fully fluidized sludge blanket has been used in the chemical treatment of water where the concentration of suspension, as a rule, makes tenths of grams of dry matter per cubic meter. The velocity of liquid flow at the surface of the sludge blanket achieves currently the values of 4-4.5 m per hour while the suspension withdrawn from the surface of the sludge blanket is four times to eight times thicker, the withdrawn flocks being later subjected to secondary thickening by sedimentation. A partially fluidized sludge blanket can be used in biological treatment of sewage where current concentrations of the suspension make 4 to 6 kg of dry matter per cubic meter and the separated thickened suspension is returned back into the treatment process. The flow velocity of liquid at the surface of the sludge blanket currently achieves values of 0.8-1 meter per hour and the withdrawn suspension may thicken from 1.5 times up to the double.

Of course all limit values depend upon a number of parameters, of which especially the water temperature and the character of suspension have remarkable influence. By monitoring many plants over a number of years these parameters were found to influence the limit values within 10 to 30 percent, as a rule.

The separation spaces wherein the described filtration in the sludge blanket takes place have usually the form of an upwards broadening cone, pyramid or prism, ensuring the decrease of liquid flow velocity in the upward direction. They are limited by inclined walls, usually 52° to 60° inclination which, on the one hand side, prevents flocks from depositing layers on these walls and, on the other hand, it provides sufficient surface for the surface of sludge blanket. The stream of liquid in these separation zones has, due to their shape, in addition to the vertical upward component, also a horizontal component directed to the inclined walls. Against the vertical component of flow the flocks are subjected to gravitation forces in downward direction. Being combined these forces result in a horizontal force that urges the flocks in direction to the inclined walls. Owing to that the concentration of suspension increases at the inclined walls, resulting in downward density streams along these walls. In a partially fluidized sludge blanket the agglomerates of flocks falling down continue, after having contacted the inclined wall, also as density streams. The concentration of suspension in the density streams is then further influenced by two contrary effects: on the one hand, due to the gravitation force, further thickening of the suspension takes place in the density stream flowing down along an inclined wall; on the other hand the counterflow of liquid streaming towards the separation space in the upward direction washes through the density flow diluting, on the contrary, the suspension in the density flow.

The separators for the sludge blanket are further equipped with the withdrawal of pure liquid without suspension at the top, usually in the form of overflow troughs or perforated tubes, and at the bottom they are provided with inlet of liquid with suspension to be separated.

The simplest solution of this inlet is a simple hole connecting the separation space with another functional space, such as an activation space in case of biological waste treatment or a coagulation space in case of chemical water treatment. However, also more complex solutions are known, such as in form of inclined feeding channels along the walls of the separation space, or in form of a central inlet pipe passing vertically through the center of the separation space. Such inlet channels or pipes are then connected with another functional space from which the liquid with suspension usually flows down to the spot of the actual entry to the separation space in which the liquid flows upwards. If the overall arrangement of the entry into the separation space is more complex, then, with regard to the above described mechanism of hydrodynamic support of the fluidized layer of the sludge blanket, under the concept of entry to the separation space the horizontal surface is understood at the upper level of the hole through which water flows to such inlet to the separation space. The upper part of the separation space for a fully fluidized sludge blanket is provided with withdrawal of separated suspension delimiting the position of the sludge blanket surface, whereas for a partially fluidized sludge blanket the withdrawal of separated suspension is arranged under the level of entry of the liquid with suspension to the separation space. The throughflow area of the liquid with suspension entry to the separation space, as a rule, makes 2.2 to 2.5 percent of the separation space for a fully fluidized sludge blanket, and 10 to 15 percent of the same for a partially fluidized sludge blanket. The larger the throughflow area of the entry to the separation space in a partially fluidized sludge blanket, the higher concentrations of suspension can be separated by this sludge blanket, but the higher also the limit for this sludge blanket to fall out.

The described principles elucidate yet another substantial difference between a partially fluidized sludge blanket and a fully fluidized one. The height of sludge blanket surface in a fully fluidized sludge blanket is constant, and if there are any changes of throughflow or concentration of the entering suspension, only the concentration of withdrawn thickened suspension varies. Exceeding the maximum performance is manifested by taking flocks out of the sludge blanket and by its surface being washed out. In a partially fluidized sludge blanket its surface height varies along with changes of throughflow and of concentration of the entering suspension, and exceeding the maximum performance is manifested by the rise of the sludge blanket up to the withdrawal level of purified liquid, with following overflow of the sludge blanket to the withdrawal.

Operation experience has shown the sludge blanket is properly functional always within a certain range of design parameters only. If the throughflow drops under about 50 percent of the rated performance in a fully fluidized sludge blanket used for chemical water treatment, disturbances of fluidization occur that have the tendency to get worse, and within a certain time they result in functional failures. If the concentration of activated sludge drops under 1-2 kg of dry matter per cubic meter in case of a partially fluidized sludge blanket used for biological treatment of water, a sludge blanket is not established in the separation space, or if the concentration of suspension has dropped under the mentioned limit, the sludge blanket is likely to fall out of the separation space, i.e., it will sink under the separation space.

The principles of fully fluidized sludge blanket and various arrangements of corresponding apparatuses are described, e. g., in the Czech Patent Specification No 88634 (S. Mackrle, V. Mackrle, I. Tesarik, V. Mican, Reactor for water treatment by sludge blanket) and the Czech Patent Specification No 123929 (S. Mackrle, V. Mackrle, O. Dracka, L. Paseka, Clarifier for water treatment by coagulation and filtration by perfectly fluidized sludge blanket) and its corresponding Canadian Patent Specification No 769769. A partially fluidized sludge blanket with spontaneous falling down of separated suspension back to the treatment process is described, e. g., in the Czech Patent Specification No 159811 (S. Mackrle, V. Mackrle Modular apparatus for biological treatment of organically polluted liquids) and its corresponding foreign patent specifications, the Canadian No 921626 and the U.S. Pat. No. 3,627,136, and is also described in the Czech Patent Specification No 173893 (S. Mackrle, V. Mackrle, O. Dracka, Reactor for biological purification of liquid, in particular sewage water) and its corresponding foreign patent specifications, the Canadian No 1038090, German No 2456953, French No 7439337 and the Japanese No 1044405. A partially fluidized sludge blanket with the application of sucking away the fallen down separated suspension is described in the Czech Patent Specification No 275746 (S. Mackrle, V. Mackrle, Method of biological activation purification of water and apparatus for performing the same), with corresponding U.S. Pat. No. 5,032,276 and EP 345669.

The drawbacks of the prior art are substantially eliminated by the method according to the present invention characterized in that the thickened separated suspension in form of flocks from the sludge blanket is withdrawn from the zone of the fluidized layer, the velocity of upward flow in the fluidized layer decreasing essentially in the upward direction.

It is beneficial if the thickened separated suspension in form of flocks of the sludge blanket is withdrawn from an outer boundary zone of the fluidized layer and if the velocity of flow in the upward direction decreases both above the level of the withdrawal of the thickened suspension and under the same.

It is further important that the layer of the sludge blanket above the withdrawal level of the thickened suspension functions as a partially fluidized sludge blanket wherein agglomerates of thickened suspension are established that are then removed, the layer of sludge blanket under the withdrawal level of thickened suspension functioning as a fully fluidized sludge blanket wherein the liquid flow is distributed into the partially fluidized sludge blanket.

It is preferable for reducing the volume of withdrawn excess suspension if the separated thickened suspension removed from the fluidized layer forcibly moves downward while getting further thickened, and, if the concentration of inflowing suspension exceeds 1 kg of dry matter per cubic meter, the velocity of upward water flow immediately above the surface of sludge blanket is in the range of 1.6 to 2.2 meters per hour and the water flow velocity at the entrance to the sludge blanket is within the range of 2 to 6 cm per second. The volume of withdrawn thickened suspension makes 1.5 multiple to 3 multiple of the volume of water without suspension withdrawn above the surface of the sludge blanket.

The object of the apparatus according to the invention for performing the described method consists in that the separator, the inner volume of which contains the separation space, is provided by at least one withdrawal spot of thickened suspension that is located above the inlet to the separator, predominantly at its outer wall or outer walls and under the surface of the sludge blanket.

It is also substantial that the withdrawal spot of the thickened suspension are vertically located in the middle part of the separation space, close to at least one of its outer walls, while the separation space within the separator essentially widens in the upward direction both above the level of withdrawal of the thickened suspension and underneath the same.

According to another variant of the apparatus according to the invention it is important that the separation space within the separator, in its bottom part, is limited at least by one, at least partially inclined inner wall, while the space between the bottom part of the outer wall and the inner wall creates a thickening space, whereas the gap between the upper edge of this inner wall and the outer wall represents the withdrawal spot of thickened suspension from the separation space.

Along with that it is beneficial if the gap between the upper edge of the inner wall and the outer wall also creates an entry to the thickening space that is provided with means for withdrawing the thickened suspension in its bottom part.

Yet another variant is preferable wherein the means for withdrawing thickened suspension are created by a horizontally arranged collecting tube arranged adjacent to the inclined outer wall of the separator.

A contribution is offered also by an embodiment wherein the inclined outer wall of the separator makes an angle in the withdrawal zone of thickened suspension, the upper part above this level being more inclined than the bottom part of the same underneath.

Considering the effectiveness of removing the thickened suspension, it is beneficial if the separator, and consequently also the separation space, suddenly widens upwards at the place of collecting tubes, while the side of collecting tubes turned to the upper part of shifted inclined outer wall is provided with apertures.

It is advantageous for the functioning of the apparatus according to the invention that the area of entrance to the separation space makes more than 3 percent and less than 6 percent of the surface of the separation space at the level of withdrawal of liquid without suspension, whereas the area of the separation space immediately under the removal level of thickened suspension makes more than 20 percent, and immediately above the level of thickened suspension removal it makes less than 70 percent of the surface of the separation space at the level of withdrawing liquid without suspension. It is also preferable to maintain a vertical distance of more than one meter between the withdrawal level of thickened suspension and both the height of entry to the separation space and the height of withdrawing the liquid without suspension.

It is also significant that the height of the withdrawal level of thickened suspension above the level of entry into the separation space is in the range from ¼ to ¾ of the height of withdrawing liquid without suspension above the entry level into the separation space.

Considering the design it is a contribution that at least one functional tube from the group created by the collecting tubes of the thickened suspension, collecting tubes for withdrawing the thickened suspension, the collecting tubes for withdrawing liquid without suspension, the tubes serving as discharge, the inlet pipes of pressure air and the rinsing pipes, creates also a part of the supporting structure of the outer walls of the separation space.

It is also advantageous if the angle of the upper part of the inclined outer wall is within the range between 52° and 60° or, possibly, if the angle of the inclined inner wall is within the range between 52° and 60°, whereas the angle of the bottom part of the inclined outer wall is within the range of 30° to 40°.

The most essential advantage of the method and the apparatus according to the present invention is a substantial improvement of the efficiency of separation, which is enabled in particular by the increase of solids load of the separation when separating a concentrated suspension, and namely up to the double achievable by known systems of fluid filtration using a partially fluidized sludge blanket. This can be made use of either for increasing the hydraulic load and, accordingly, for enhancing the separation capacity, or for increasing the concentration of suspension entering the sludge blanket or, possibly, for an optimum combination of both these effects. Such quantitative improvement of separation efficiency will be a special contribution for the activation type of biological waste water treatment regarding the savings in the design of integrated biological reactors. The increase of hydraulic load owing to the application of the method and apparatus according to the present invention allows to cut down the separation space, and namely by up to 50 percent against the dimensions of hitherto known plants using a partially fluidized sludge blanket. This brings not only savings relating to the construction of the separator, but also further construction savings, such as by reducing the necessary height of the integrated biological reactor and easier accommodation of the separator in the reactor. The increased concentration of activated sludge in the biological reactor is also reflected in cutting down the functional volumes that are necessary for biological processes and thereby also cutting down the overall size of the reactor. The reduction of the separator size and the optimization of the construction and of the dimensions of the reactor allow to achieve considerable savings of material, manufacturing cost, transport, and installation. Another advantage of the method and apparatus for implementing the method according to the present invention is their functioning within a substantially broader range of parameters than in the case of a partially fluidized sludge blanket. This widens the scope of utilization of the method and the apparatus and enables their substantially improved flexibility during operation.

BRIEF DESCRIPTION OF THE DRAWINGS

Four exemplifying embodiments of the invention will be described, where.

DETAILED DESCRIPTION

Figure 1:
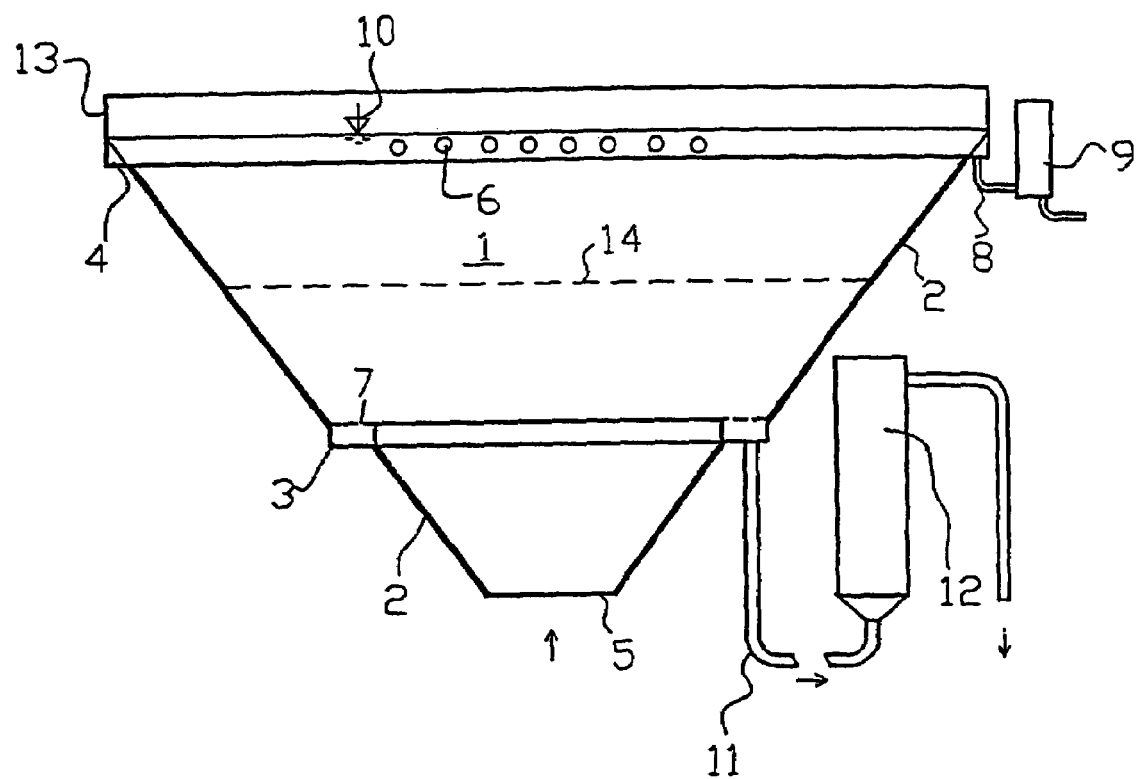
FIG. 1 shows the first example of embodiment of an apparatus according to the invention in side section.

For full understanding the examples of apparatus are always described as parts of an exemplary integrated reactor for the activation treatment of waste water, with nitrification and de-nitrification by uniform suspended activated sludge; the examples of apparatus in such exemplary integrated reactor serve for separating the flocculating suspension that is produced during the mentioned treatment. The parts that are functionally and constructionally similar are designated with the same reference numerals in various examples of embodiment.

EXAMPLE 1

The basic part of the apparatus for the separation of flocculating suspension according to this invention is separator 1 in form of an upwards widening cone limited by outerwall 2 in shape of a conical casing (FIG. 1, 2). The shape of the cone of separator 1 can be also noncontinuous in the sense that it may comprise not illustrated short cylindrical parts, or even tapered parts of opposite inclination, e.g., due to manufacturing or design reasons.

The inner space of separator 1 contains a separation space; according to this example of embodiment the inner space of separator 1 practically coincides with the separation space. The outer wall 2 comprises an inserted means for withdrawing the thickened suspension, and namely in form of a circular wound collecting tube 3 of angular section and its upper part accommodates another means for withdrawing liquid without suspension in form of circular wound collecting tube 4 of triangular section.

The height of withdrawal level of thickened suspension above the level of inlet 5 into separator 1 and, accordingly, into the separation space, is within the range of ¼ to ¾ of the height of the level of withdrawing liquid without suspension above the level of inlet 5 into the separation space. It is preferable to arrange the means for withdrawing the thickened suspension to middle height of separator 1. The collecting tubes 3 and 4 can have other sections, the mentioned shapes being only advantageous.

A set-back of the outer wall 2 in the diameter is provided at the level of the lower collecting tube 3, but the outer wall 2 can be also performed as a continuous conical area without any abrupt change. The bottom part of the outer wall 2 is terminated by the inlet 5 into separator 1 that is performed as the entry opening.

The upper collecting tube 4 for withdrawing liquid without suspension is provided with hole 6 at its outer inclined side, whereas the lower collecting tube 3 for withdrawing thickened suspension is provided with holes 7 in its upper horizontal side. Both perforated tubes 3 and 4 represent also construction elements creating the supporting structure of separator 1. The upper collecting tube 4 mouths into discharge 8 arranging overflow 9 for maintaining constant surface 10 of water in separator 1. The lower collecting tube 3 is connected with recirculation pump 12 via tube 11. The outer wall 2 above the upper collecting tube 4 can end with another shape rather than a cone, due to operational reasons, such as a cylindrical endpiece 13. During the operation of the apparatus the surface 14 of sludge blanket is located between the perforated lower collecting tube 3 and the perforated upper collecting tube 4.

The described example of an embodiment for separating flocculating suspension creates a part of a reactor for biological activation treatment of waste water consisting, according to this example of embodiment, of tank 15 divided so as to form an oxic space 16 and an anoxic space 17 that communicate via connection 18. This connection 18, e.g., can be performed as a notch in the partition wall 19 separating the oxic space 16 from the anoxic space 17.

Figure 3:
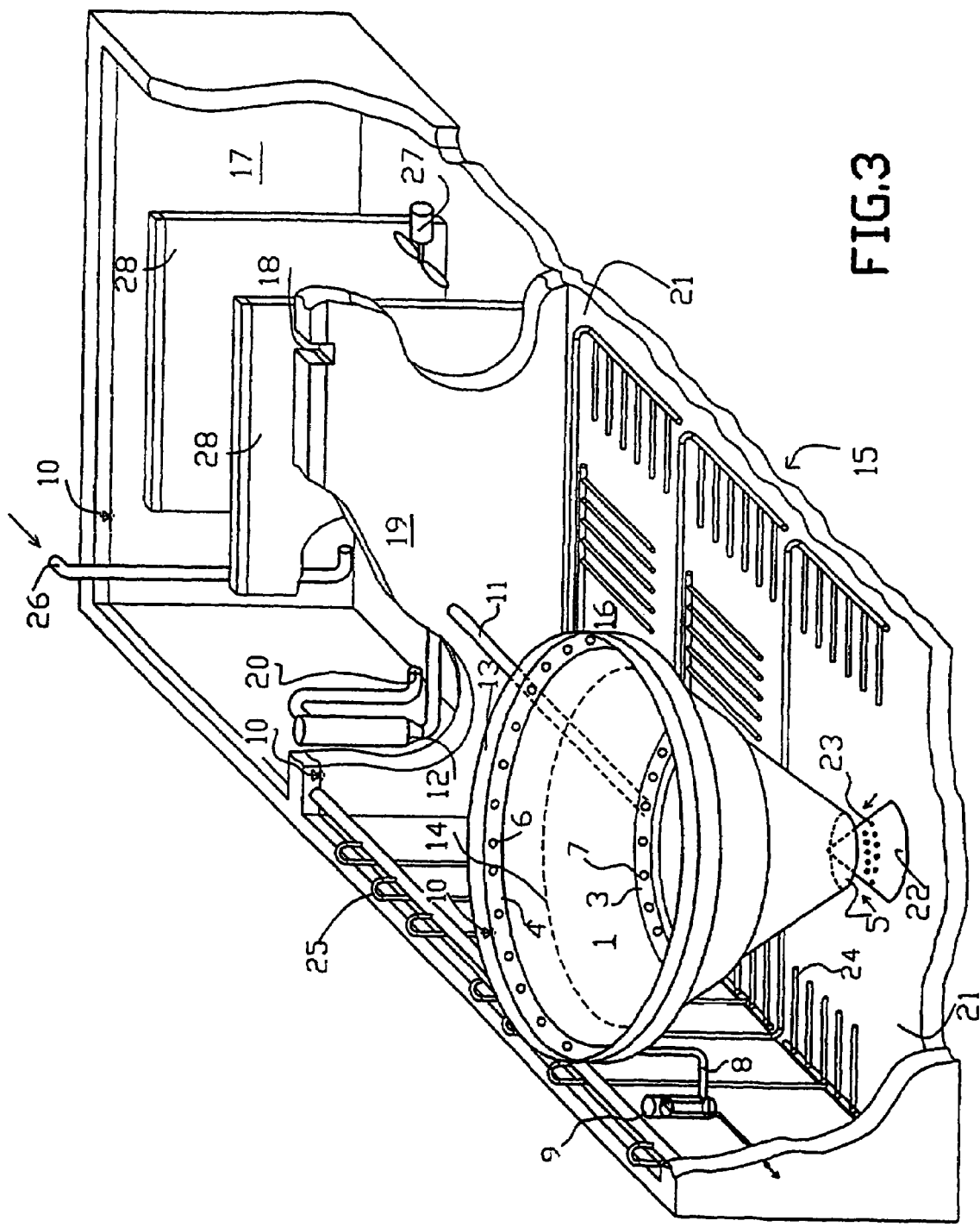
FIG. 3 is an integration of the first example of embodiment into an exemplary integrated reactor for activation treatment of waste water.

The oxic space 16 of the reactor according to the example of embodiment accommodates the described separator 1 whose inlet 5 thus communicates with the oxic space 16, whereas the outlet 20 of the recirculation pump 12 mouths in the anoxic space 17. The bottom 21 of tank 15, under the inlet 5 into the separator 1, accommodates countercone 22 (FIG. 3) having holes 23 in its upper part. The oxic space 16 is provided with aeration elements 24 connected with the inlet pipe 25 of pressure air (FIG. 3), whereas the anoxic space 17 is provided with inlet 26 of waste water and agitator 27 directed between two parallel deflecting walls 28 that are vertically arranged in the anoxic space 17.

The inlet 26 of waste water and outlet 20 of re-circulation pump 12 mouth in opposite corners of the anoxic space 17 to the bottom 21 or, possibly, to middle depth of tank 15, the connection 18 with the separation space being performed close to surface 10 of water in tank 15.

Figure 2:
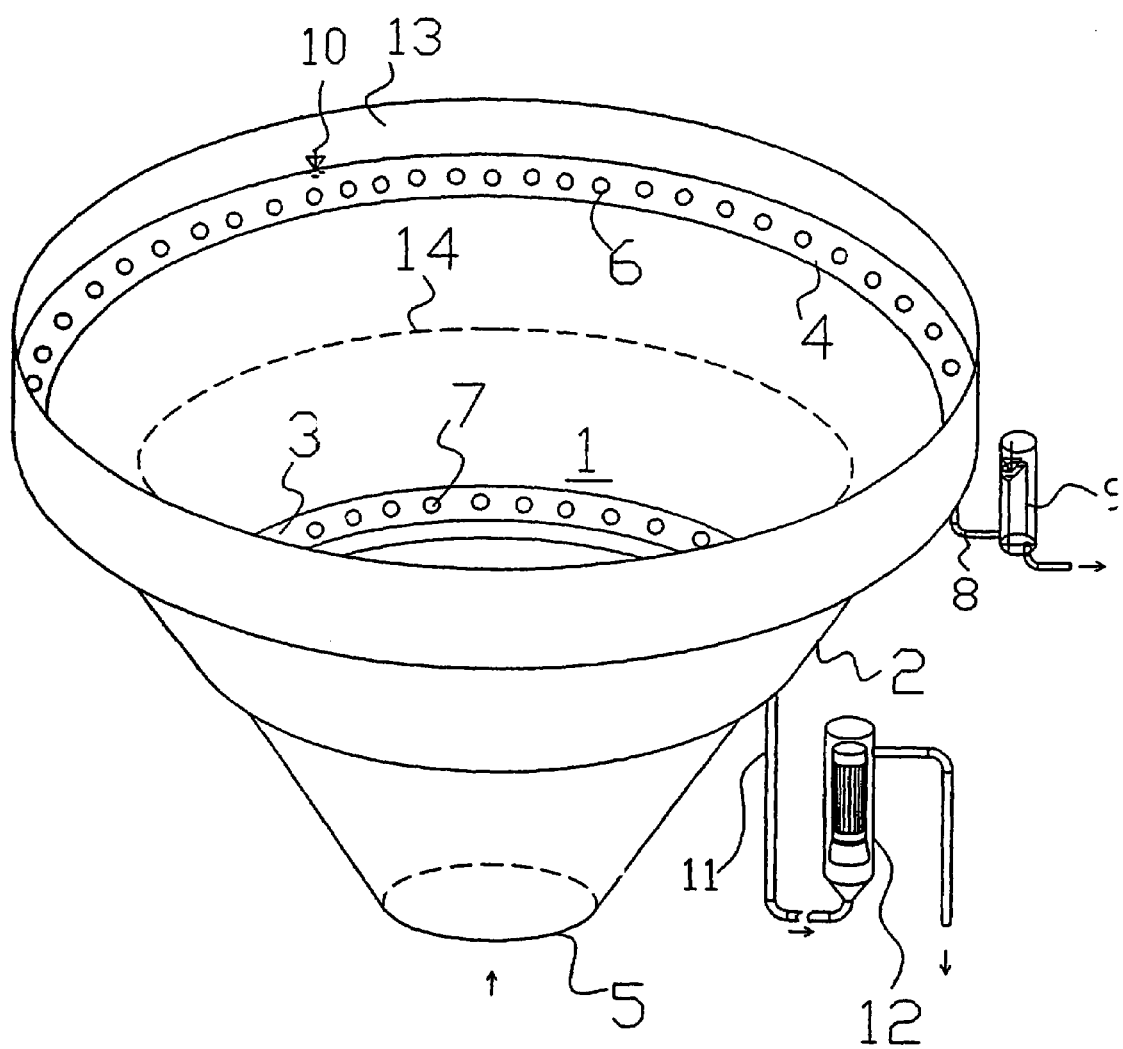
FIG. 2 shows the first example of embodiment of an apparatus according to the invention in axonometric representation.

The described apparatus works as follows. Water with flocculating suspension composed of biologically activated sludge flows into the separation space through inlet 5. In the separation space the water flows upwards, and since the separation space in separator 1 substantially widens in the upward direction, the velocity of water flow substantially decreases in the upward direction. Within the separation space a known process results in a fluid layer of a sludge blanket wherein the suspension from the streaming liquid gets caught. The fluidized layer of the sludge blanket in the separation space creates the surface 14 of the sludge blanket above the level of the lower collecting tube 3 for withdrawing the thickened suspension and under the level of the upper collecting tube 4 for withdrawing liquid without suspension, while above the sludge blanket surface 14 a layer of liquid without suspension is located (FIGS. 1, 2).

It can be summarized that the flocculating suspension gets separated from liquid by filtration in the fluidized layer of the sludge blanket wherein the flocks are created of the separated suspension and the fluidization is maintained by the upward flow of liquid. The liquid with suspension enters the fluidized layer from the bottom and the liquid freed from suspension is withdrawn above the surface 14 of the sludge blanket represented by an interface between the fluidized layer and the liquid without suspension. The separated thickened suspension in form of flocks from the sludge blanket is withdrawn from the zone of the fluidized layer, while the velocity of upward flow in the fluidized layer essentially decreases in the upward direction.

The layer of sludge blanket above the level of withdrawing the thickened suspension operates as a partially fluidized sludge blanket wherein the thickened suspension further densifies, namely agglomerates of thickened suspension are formed and then withdrawn. The layer of sludge blanket under the withdrawal level of thickened suspension operates as a fully fluidized sludge blanket wherein the liquid flow is uniformly distributed into the partially fluidized sludge blanket. Such distribution is due to the fact that the fluidized layer functions as porous environment the resistance of which distributes the flow, especially the upward flow, to the whole through-flow profile. Consequently, in the bottom fluidized layer of the fully fluidized sludge blanket the stream of suspension gets distributed into the whole profile of the separation space, thus entering uniformly the fluidized layer of the partially fluidized sludge blanket. In analogy, close to surface 14 of the sludge blanket the flow is uniformly distributed in the whole area.

Separator 1 is connected by inlet 5 with the oxic space 16 which is connected via connection 18 with the anoxic space 17, the overflow 9 maintains the constant surface 10 of water in the whole tank 15. Accordingly, exactly the same volume of liquid that has entered tank 15 through inlet 26 of waste water (FIG. 3) will flow out of tank 15 through the upper collecting tube 4 and holes 6 in the same and further via discharge 8 over overflow 9. If the volume of water without suspension having flown through discharge 8 from the separation space is $Q_o$, and the volume of thickened suspension withdrawn by recirculation pump 12 from the separation space is $Q_s$, then the volume of water with suspension that comes through inlet 5 into the separation space equals $Q_o+Q_s$. If the concentration of suspension in the water flowing into the separation space through the inlet 5 is C, whereas the concentration of thickened suspension that is being withdrawn is $C_s$, then the volume of suspension having come into the separation space is $C(Q_o+Q_s)$, whereas the volume of suspension that is withdrawn from the separation space is $C_sQ_s$. In a steady condition both volumes shall be equal and, accordingly, it holds for the concentration of withdrawn thickened suspension in steady state: $C_{ss}=C(Q_o+Q_s)/Q_s$. If the concentration of withdrawn thickened suspension is less than $C_{ss}$, the volume of suspension in the sludge blanket grows and due to that the surface 10 of sludge blanket rises, if the concentration of withdrawn thickened suspension is more than $C_{ss}$, the volume of suspension in the sludge blanket drops and the surface 10 of sludge blanket sinks. All amounts Q are specified in volume units per unit of time, such as cubic meters per hour, whereas the concentrations are specified, e.g., as kg per cubic meter. Accordingly, the height of surface 14 of the sludge blanket varies and depends upon mass balance, in the same way as in the partially fluidized sludge blanket. In a certain range of parameters a sludge blanket has auto-regulating properties: the concentration of withdrawn thickened suspension $C_s$ grows along with rising height of surface 14 of the sludge blanket, and due to that, for a certain adjusted value of $Q_s$ and the given value $Q_o$ the surface 14 of the sludge blanket will automatically stabilize at a level allowing to fulfill the condition $C_s=C_{ss}$.

The applied symbols should be understood as follows:
C concentration of suspension in the activation mixture flowing into the separation space
$Q_o$ volume amount of water without suspension flowing out of the separation space
$Q_s$ volume amount of thickened suspension withdrawn from the separation space
$C_s$ concentration of withdrawn thickened suspension
$C_{ss}$ concentration of withdrawn thickened suspension in steady state.

Density streams with thickened suspension that flow under surface 14 of the sludge blanket along the inner side of the inclined outer wall 2 of separator 1 downwards, get down to the collecting tube 3 for the withdrawal of thickened suspension, wherefrom they are sucked away by the operation of the re-circulation pump 12. Since the holes 7 in the collecting pipe serving for the withdrawal of thickened suspension are located at the upper side, the density streams above the collecting tube 3 are subject to withdrawal. Such arrangement reduces the dilution of withdrawn thickened suspension.

A theoretically feasible limit for maximum flow velocity at the height of surface 14 of sludge blanket corresponds with a velocity of about 2-2.2 mph, during which the fully fluidized sludge blanket starts being converted to a partially fluidized sludge blanket, i.e., 50 percent of the currently achieved velocities 4-4.5 meters per hour in a fully fluidized sludge blanket.

Experiments with the described apparatus wherein the throughflow area of separation space closely under the level of withdrawing the thickened suspension through the collecting tube 3 amounted to 25 percent of the area of the separation space at the withdrawal level of liquid without suspension through collecting tube 4 showed the maximum flow velocity at the surface 14 of the sludge blanket in this apparatus to be within the range of 1.6-1.9 mph. In case of exceeding this value the sludge blanket would already flow over into the withdrawal means of purified liquid. The consequence is an approximately doubled performance as compared with hitherto known equipment with partially fluidized sludge blanket. The experiments show to be preferable if the volume amount of thickened suspension removed by re-circulation pump 12 equals approximately double the volume amount of water without suspension that has flown away through discharge 8, i.e.

$Q_s$=approx. 2 $Q_o$.

Since excess thickened suspension is removed from the sludge blanket in the zone of its outer circumference in the described apparatus, without falling out through inlet 5, the throughflow area of inlet 5 can be smaller than in the known equipments with partially fluidized sludge blanket and, accordingly, the sludge blanket under the level of withdrawing the thickened suspension through collecting tube 3 can function as a fully fluidized one. This allows to inhibit the effect of falling out of the sludge blanket during lower onflow of suspension, which currently limits the scope of application of a partially fluidized sludge blanket. In order to allow the sludge blanket under the withdrawal level of thickened suspension to function as a fully fluidized one, the flow velocity of water at the entrance into the sludge blanket shall comply with values for a fully fluidized sludge blanket, i.e., it shall be within the range of 2 to 6 centimeters per second. Considering the volume amount of re-circulated suspension and the output of the apparatus, it is preferable to arrange the area of inlet 5 so as to be larger than 3 percent and smaller than 6 percent of the area of the separation space at the level of withdrawing the liquid without suspension through way of collecting tube 4.

The volume amount of withdrawn thickened suspension is in the range of 1.5 times to 3 times the volume amount of water without suspension withdrawn above the surface of the sludge blanket.

In the oxic space 16 and the anoxic space 17 of the reactor for biological activation treatment of waste water, under the presence of activated sludge returned by re-circulation pump 12, the known activation treatment of waste water that is brought to the reactor by the inlet 26 of waste water is performed, the purified water flowing away by discharge 8 over the overflow 9. If the waste water contains compounds of nitrogen, such as sewage, the anoxic space 17 functions as a front-end de-nitrification space wherein the nitrates are reduced to gaseous nitrogen. The mentioned nitrates formed by oxidation of nitrogen compounds in the oxic space 16 are returned into the anoxic space 17 in the water that flows back from the oxic space 16 over separator 1 together with the returned activated sludge through outlet 20 of recirculation pump 12. The above described arrangement of inlet 26 of waste water and the outlet 20 of re-circulation pump 12, together with the flow induced by agitator 27 and channeled by deflecting walls 28 lead, in a part of the anoxic space 17, to the creation of anaerobic conditions supporting the biological removal of phosphorus, while the described location of connection 18 ensures that the brought waste water shall pass through the whole anoxic space 17 prior to flowing over into the oxic space 16.

If the operation of the apparatus is interrupted, such as due to a dropout of power or during an outage, the fluidization of the sludge blanket is interrupted, the sludge blanket sediments and the settled activated sludge accumulates in the zone of inlet 5 to separator 1. If the interruption takes a longer time, the settled activated sludge assumes a gel structure, which can result in a plug in the zone of inlet 5 preventing to resume the function of the apparatus when the operation is restarted. That is why pressure water and pressure air are introduced into countercone 22 upon restarting the operation. Both media are injected through openings 23 in the upper part of counter-cone 22, bringing about intensive turbulence that breaks the layers of settled sludge and cleans the zone of inlet 5 into separator 1. In addition to this function the counter-cone 22 has yet another purpose residing in directing the flow under the inlet 5 into separator 1 for preventing the sedimentation of suspension on the bottom of tank 15 under the center of inlet 5.

EXAMPLE 2

Figure 4:
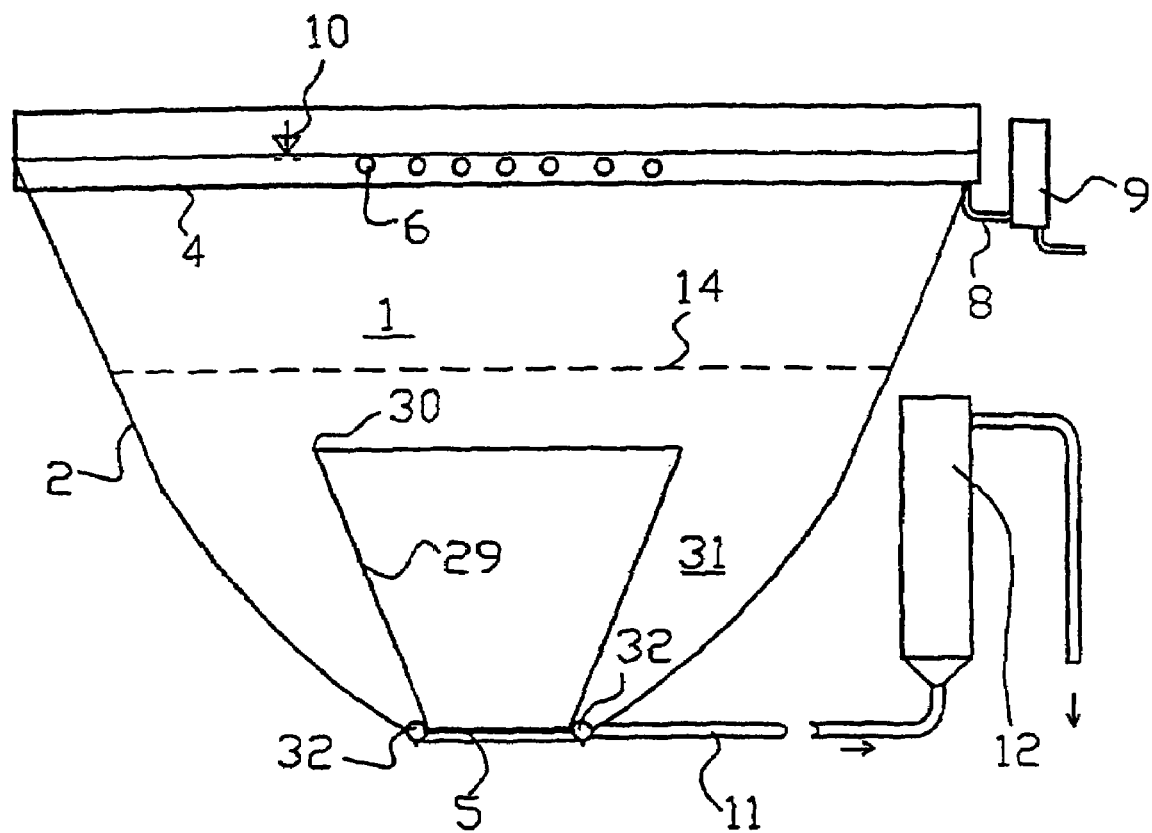
FIG. 4 is a second exemplary embodiment of the apparatus in side section, FIG. 5 the second exemplary embodiment in axonometric representation, FIG. 6 a third exemplary embodiment of the apparatus in side section within an exemplary integrated biological reactor, FIG. 7 an axonometric representation of an exemplary embodiment according to FIG. 6.
Figure 5:
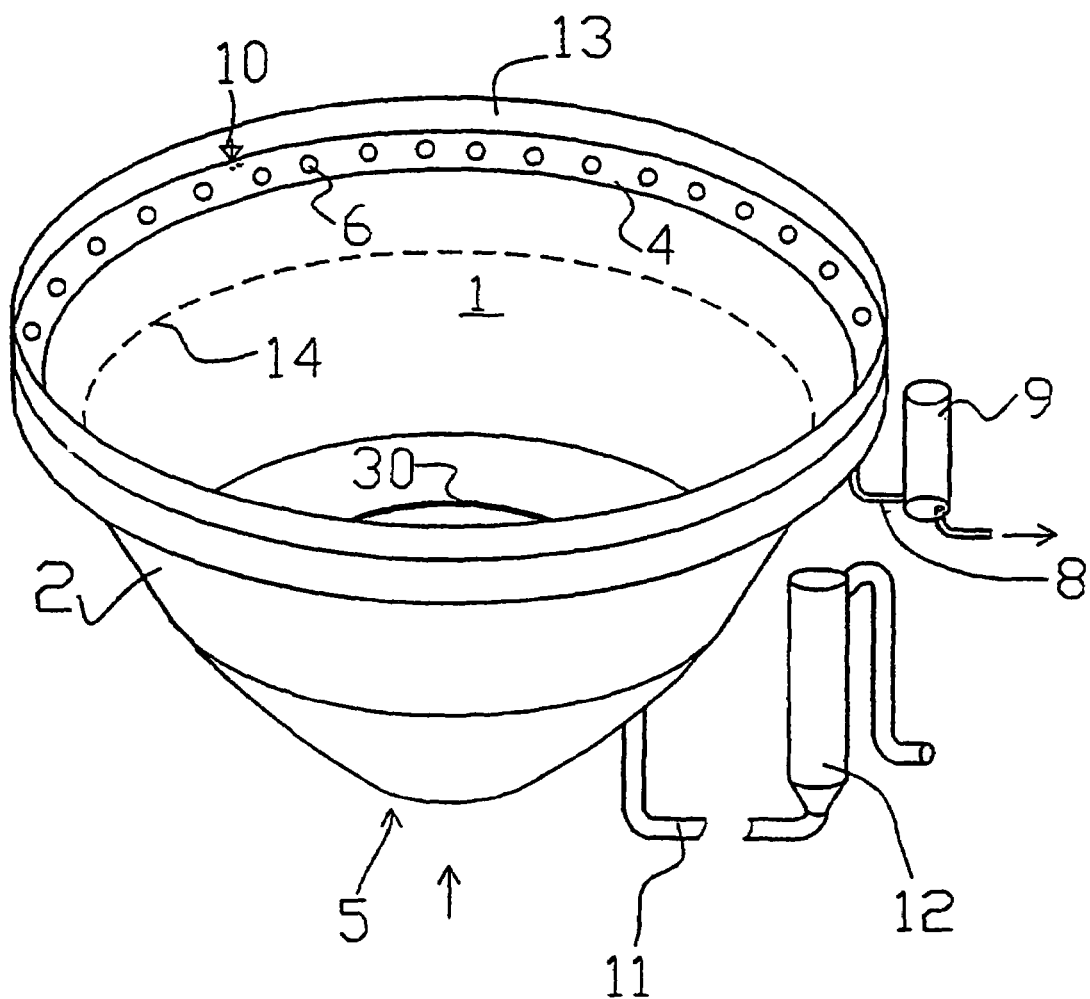

The second example of embodiment of the apparatus according to the invention is illustrated in FIGS. 4 and 5. Separator 1 is, in analogy with example 1, essentially limited by the upward widening conical wall 2. The bottom part of separator 1 accommodates a conical inner wall 29 that is attached to the bottom edge of outer wall 2 with its bottom edge (FIG. 4). The inner wall 29 limits also the space that is broadening in the upward direction and reaches to the level of one third to one half of the height of separation space. The separation space, accordingly, is limited by inner wall 29 in the bottom part of separator 1 and by outer wall 2 in the upper part of the separation space. Thus the separation space is a part of the inner space of separator 1, which can be also expressed by saying that the inner space of separator 1 contains a separation space. The outer wall 2 above the upper edge 30 of the inner wall 29 has conical shape, whereas under the level of the upper edge 30 it has the form of an elliptic canopy and its inclination in this part decreases from 52°-60° down to 30°-40°.

The zone between the outer wall 2 and the inner wall 29 creates a thickening space 31 of the suspension provided, in its bottom part, with a withdrawal of thickened suspension in form of collecting tube 32 wound to form a circle. This collecting tube 32 has preferably circular section and forms also a supporting structure bearing at its outside the bottom edge of outer wall 2 and at the inside the bottom edge of inner wall 29. The bottom edge of inner wall 29 creates an entrance representing inlet 5 into the separation space of separator 1. The not illustrated openings in the collecting tube 32 for withdrawing the thickened suspension are performed at the bottom edge of outer wall 2. The collecting tube 32 is connected via tube 11 to the re-circulation pump 12 similarly as in example 1.

It can be summarized that the bottom part of the separation space is limited by at least one at least partially inclined inner wall 29, the space between the bottom part of outer wall 2 and inner wall 29 creating the thickening space 31. The gap, or possibly the area of the gap between the upper edge of this inner wall 29 and the outer wall 2 having the form of annular ring in this example, represents the removal spot of thickened suspension where the thickened suspension is withdrawn from the separation space. This gap forms also the entry to the thickening space 31 the bottom part of which is provided with means for withdrawing the thickened suspension.

The upper part of outer wall 2, in analogy with example 1, accommodates means for withdrawing liquid without suspension in form of an inserted circularly wound collecting tube 4 of triangular section with openings 6 in the inclined inner side for withdrawing liquid without suspension. The collecting tube 4 mouths into discharge 8 wherein the overflow 9 is installed for maintaining constant surface 10 of water in separator 1.

The reactor for biological activation treatment of waste water accommodating the described apparatus according to example 2 is the same as in example 1. The apparatus according to example 2 works in the same way as the apparatus according to example 1, with the only difference that the density streams with thickened suspension that flow under surface 14 of the sludge blanket along the inner side of the inclined outer wall 2 downwards, flow at the level of the upper edge 30 of the inner wall 29 through the annular ring between this upper edge 30 and the outer wall 2 into the thickening space 31. Here a further thickening of the suspension takes place prior to its being sucked away by re-circulating pump 12 through the holes in the collecting tube 32.

This thickening takes place due to the fact that the diluting effect of the counter-flow of liquid entering the separation space is inhibited in the thickening space 31 and, accordingly, during the flow of density streams along the inner side of outer wall 2 downwards the densifying effect prevails. The liquid or, possibly, the diluted suspension that has been pushed out of the density stream during the thickening process, flows away along the outer side of the inclined inner wall 29 upwards, thus returning into the sludge blanket. This is supported by the flow of liquid with suspension in the separation space that joins, above the upper edge 30 of inclined inner wall 29, with the flow of liquid that has been pushed out. Due to higher density of suspension removed by re-circulation pump 12 and, accordingly, also higher concentration $C_s$ of thickened suspension, under the same values of $Q_o$ and $Q_u$, the concentration C of suspension in the water flowing into the separation space through the inlet 5 is higher than in example 1. Since, due to the thickened suspension being sucked away by collecting tube 32 at the bottom of thickening space 31, the overall flow in the thickening space 31 is falling, thus supporting the downward movement of suspension, the inclination of outer wall 2 in this region can be smaller than the inclination in the upper part of separator 1. Experimental experience relating to sliding of flocculating suspension along the inclined walls in the presence of downward flow has shown that in case of 30 to 40 inclination of the walls no sediments of suspension flocks are seen on these walls and, consequently, this inclination has been applied for the bottom part of outer wall 2 in the bottom part of thickening space 31.

EXAMPLE 3

Figure 6:
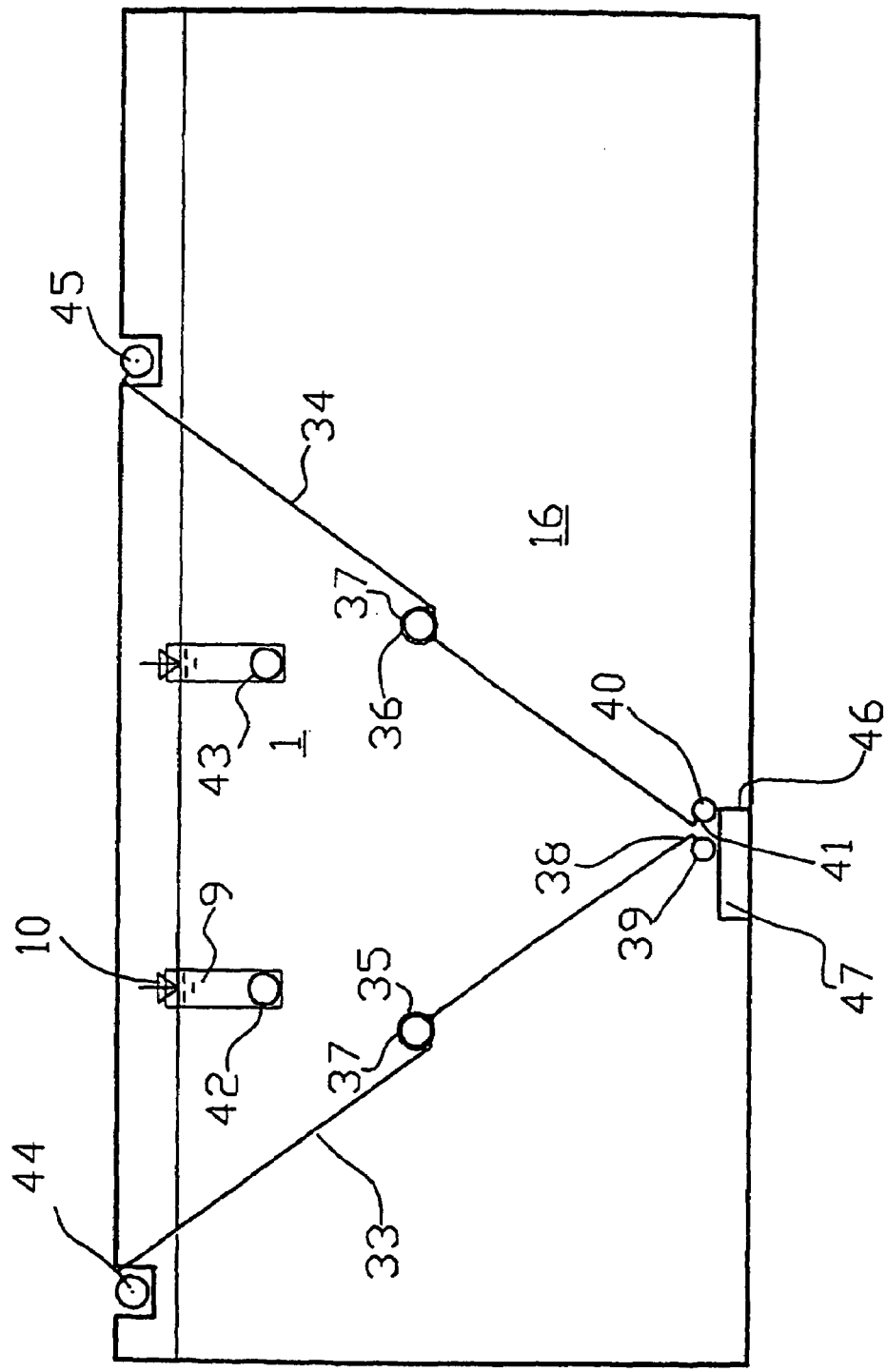
Figure 7:
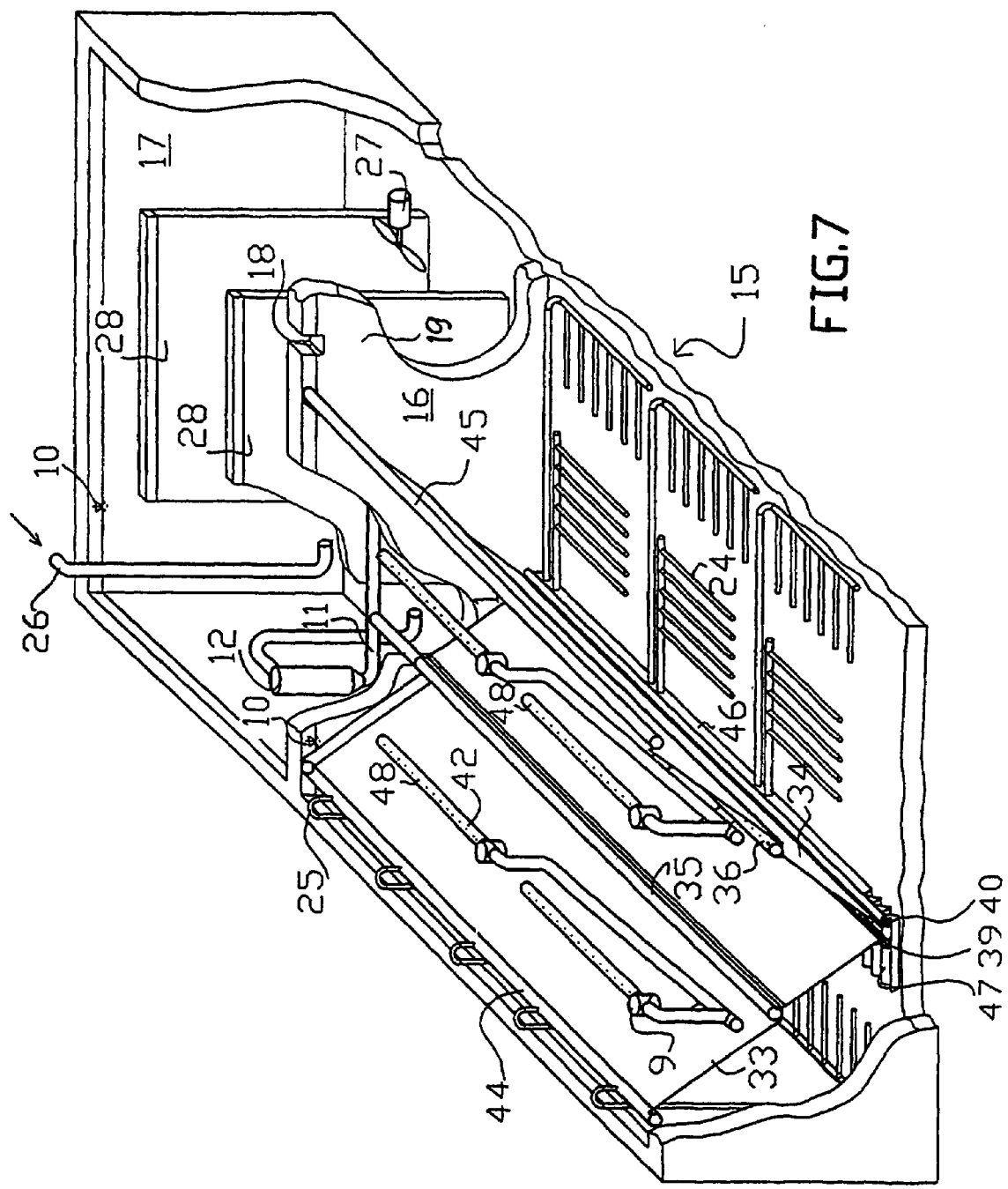

The third example of apparatus according to the invention is illustrated in FIGS. 6 and 7.

This embodiment has a longitudinal separator 1 in form of an upward widening prism created by inclined outer walls 33 and 34 of which each accommodates at middle height, similarly as in example 1, collecting tubes 35 and 36 for withdrawal of thickened suspension that are connected with the re-circulation pump 12. The inner space of separator 1 represents the separation space. The collecting tubes 35 and 36 are part of the inclined outer walls 33 and 34 whose parts are attached to these tubes. In the place of collecting tubes 35 and 36 the upper parts of outer walls 33 and 34 are shifted against the bottom parts so that separator 1 and, consequently, also the separation space, get broadened by a jump in this place. The collecting tubes 35 and 36 for the withdrawal of thickened suspension are provided with holes 37 that are provided in the sides of tubes 35 and 36 that are turned to the upper part of the shifted inclined outer walls 33 and 34.

The bottom edges of inclined outer walls 33 and 34 create the inlet 38 into separator 1 in form of an oblong rectangular gap. At the level of inlet 38 the inclined outer walls 33 and 34 are provided with rinsing pipes 39 and 40 having holes 41 for the inlet of water and air at least in two rows.

The upper part of separator 1 accommodates collecting tubes 42 and 43 for withdrawing liquid without suspension having overflows 9 in analogy with the preceding embodiment. All overflows 9 are adjusted to the same level in order to ensure uniform outflow of liquid. The collecting tubes 42 and 43 are provided with holes 48 at their tops for the inlet of purified water (FIG. 7). The upper edge of inclined outer walls 33 and 34 carry inlet pipes 44 and 45 serving for the inlet of pressure air.

At least some functional tubes or, possibly, all functional tubes in the outer walls 33 and 34, i.e., the collecting tubes 35 and 36 serving for the withdrawal of thickened suspension, the collecting tubes 42 and 43 for withdrawing liquid without suspension, inlet pipes 44 and 45 serving for the inlet of pressure air, and the rinsing tubes 39 and 40, are component parts of the supporting structure of the inclined outer walls 33 and 34. To this supporting structure the wall elements are attached that create the surface of inclined outer walls 33 and 34. The described example of apparatus for the separation of flocculating suspension is a part of the reactor for biological activation treatment of waste water, that consists, in this embodiment, of tank 15 divided to an oxic space 16 and an anoxic space 17 that communicate through connection 18. The oxic space 16 accommodates the described separator 1 whose inlet 38 thus communicates with the oxic space 16, whereas the outlet 20 of recirculation pump 12 mouths in the anoxic space 17.

Separator 1 is closed by vertical fronts that are created by parts of the partition wall 19 dividing the tank 15 to an oxic space 16 and an anoxic space 17, and a part of the front wall of tank 15 that is not visible in FIGS. 6 and 7.

Adjacent to the bottom edge of one inclined outer wall 34 a closing wall 46 is arranged that reaches down to the bottom of tank 15, to the partition wall 19 and to the front wall of tank 15. In this way the part of the oxic space 16 between the right inclined outer wall 34 and the walls of tank 15 is closed, while communicating with other spaces only through the connection 18 in partition wall 19 and the passages 47 (FIG. 7) that are arranged essentially at the bottom of tank 15 in the closing wall 46 in its part that is most distant from the anoxic space 17. It is also worth mentioning that partition wall 19 together with the right inclined outer wall 34 divide the oxic space 16 in two parts that are interconnected with passages 47. The first part of the oxic space 16 communicates through connection 18 with the anoxic space 17 and the other part of the oxic space 16 communicates with separator 1 through the inlet 38. The closing wall 46 can be also attached to the left inclined outer wall 33, yet in such case the connection 18 should be performed at the left hand side, since both these elements should be located in the same part of the oxic space 16.

The oxic space 16 is further provided with aeration elements 24 connected to the inlet pipe 25 of pressure air. The arrangement and equipment of the anoxic space 17 is the same as in the preceding examples.

The described third exemplifying apparatus works similarly as the above described first exemplifying apparatus with the difference that the closing wall 46 eliminates shortcuts of flow in the oxic space 16 and, accordingly, the activation mixture after having come through connection 18 must flow through the first part of oxic space 16 first, and only after having flown through passages 47 it can proceed from the second part of oxic space 16 through the inlet 38 into the separation space. Another difference is based upon the fact that cleaning of the zone of inlet 38 into the separator 1 after an interruption of operation is performed by introducing pressure air and pressure water into the rinsing pipes 39 and 40 where, under simultaneous introduction of both media, the air streams through holes 41 in the upper part of rinsing pipes 39 and 40, whereas water is ejected through holes 41 that are performed in the bottom part of rinsing pipes 39 and 40.

EXAMPLE 4

Figure 8:
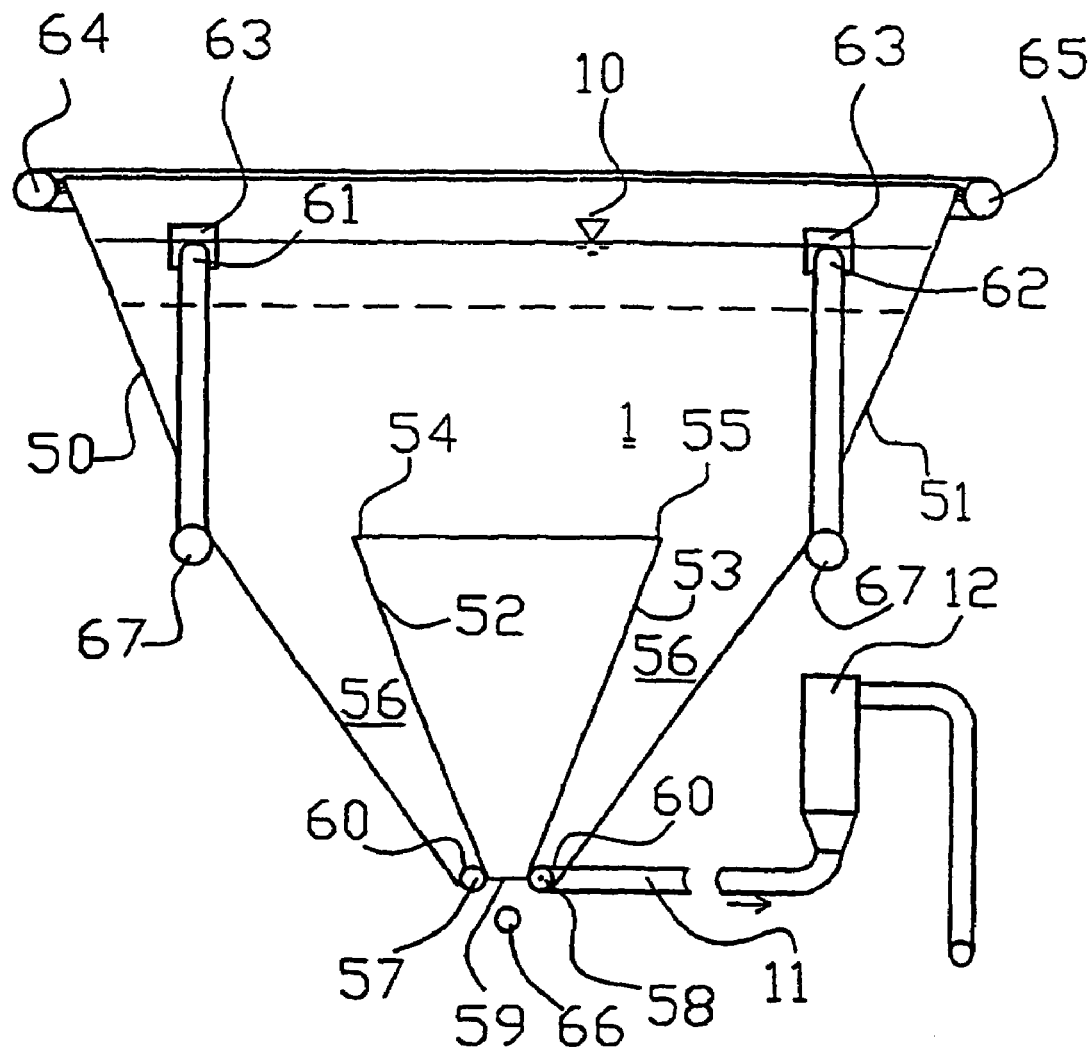
FIG. 8 shows the fourth exemplary embodiment of the apparatus in side section and FIG. 9 the fourth exemplary embodiment in axonometric representation within an exemplary integrated biological reactor.
Figure 9:
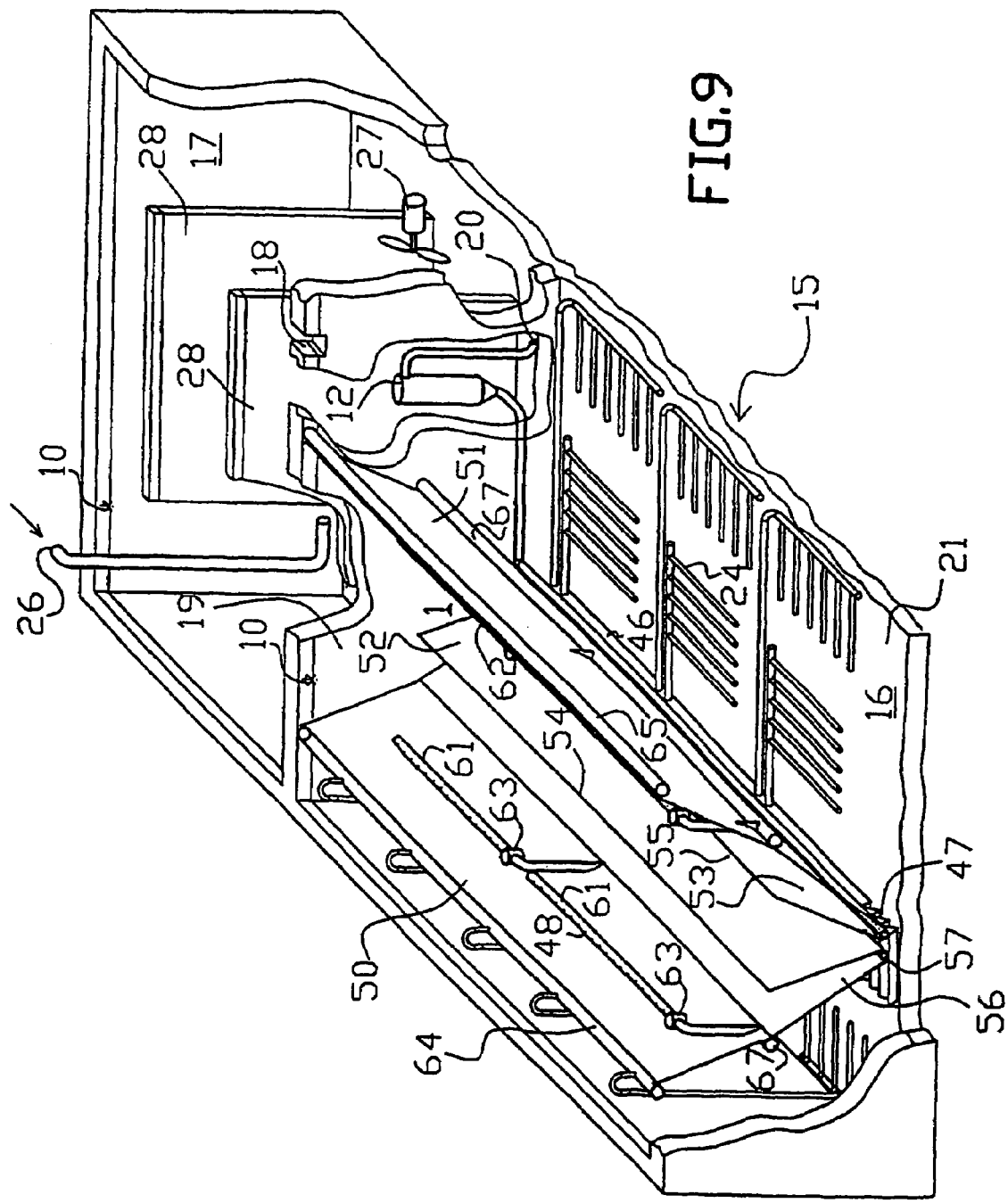

The fourth exemplifying embodiment of the apparatus is illustrated in FIGS. 8 and 9.

Separator 1 according to this example is substantially limited by upward widening inclined outer walls 50 and 51. The bottom part of separator 1 accommodates inclined inner walls 52 and 53 whose bottom edges are attached to the bottom edges of outer walls 50 and 51 (FIG. 8), which is an analogy to the embodiment according to example 2. The inner walls 52 and 53 enclose also the space that widens upwards and reaches to the level of one third to one half of the height of separator 1.

The separation space wherein the actual separation takes place, accordingly, is limited by inner walls 52 and 53 in the bottom part of separator 1, and by outer walls 50 and 51 in the upper part of separator 1. The outer walls 50 and 51 are inclined within the range of 52° to 60° above the level of the upper edges 54 and 55 of the inner walls 52 and 53. Under the level of the upper edges 54 and 55 of the inner walls 52 and 53, and approximately at the level of withdrawing thickened suspension, the outer walls 50 and 51 are provided with inclinations within the range of 30° to 40°.

The zone between the outer wall 50 or 51 and the inner wall 52 or 53 creates the thickening space 56 of suspension, while the bottom part of this space is provided with withdrawal of thickened suspension in form of collecting tubes 57 and 58. The entry to the thickening space 56 at the level of the upper edges 54 and 55 of the inner walls 52 and 53 has the form of two rectangles and represents the withdrawal spot of thickened suspension from the separation space.

The collecting tubes 57 and 58 serve also as a supporting structures for the outside to which the bottom edges of walls 50 and 51 are attached and for the inside carrying the bottom edge of inner walls 52 and 53. The bottom edge of inner walls 52 and 53 together with partition wall 19 and the front wall of tank 15 create a rectangular inlet opening representing the inlet 59 into separator 1, and thus into the separation space. The openings 60 in the collecting tubes 57 and 58 for withdrawing the thickened suspension are performed close to the bottom edge of outer walls 50 and 51. The collecting tubes 57 and 58 communicate via tube 11 with the recirculation pump 12 in analogy to example 2.

Similarly as in example 3 adjacent to the bottom edge of one inclined outer wall 51 the closing wall 46 is arranged that reaches down to the bottom of tank 15, to the partition wall 19 and to the front wall of tank 15 and has the same purpose as in example 3. Also the embodiment of passages 47 is the same. For better orientation in the picture the passages 47 and the closing wall 46 are illustrated only in FIG. 9, not in FIG. 8.

The upper part of the separation space houses the collecting tubes 61 and 62 for the withdrawal of liquid without suspension. They are provided with holes 48 for the inlet of purified liquid at their tops. The vertical parts (FIG. 9) of the collecting tubes 61 and 62 are connected with the discharge tube 67 (FIGS. 8 and 9) of purified liquid, and namely at the spot where the inclined outer walls 50 and 51 are kinked (include an angle), and it also creates a part of the supporting structure of the outer walls 50 and 51. The discharge tube 67 of purified liquid is arranged at the level of removal of thickened suspension from the separation space, which substantially corresponds with the level of the upper edges 54 and 55 of the inner walls 52 and 53.

The collecting tubes 61 and 62 are provided with overflows 63.

All overflows 63 are adjusted to the same level in order to ensure regular outflow of liquid. The upper edges of the inclined outer walls 50 and 51 accommodate the inlet pipes 64 and 65 for the inlet of pressure air that are also part of the supporting structure of the outer walls 50 and 51. Close to bottom 21 of tank 15 the cleaning pipe 66 (FIG. 8) is arranged that is not illustrated in FIG. 9 in order to maintain good understandability of the picture.

An exemplifying reactor for the biological activation treatment of waste water accommodating the described exemplifying embodiment of an apparatus for the separation of flocculating suspension is basically the same as according to example 3.

An embodiment according to example 4 works in analogy with the above described embodiment according to example 2, with the difference that instead of counter-cone 22 a cleaning pipe 66 that can function as a rinsing pipe after having been connected with water and air supply, is used for cleaning the zone of inlet 59 into separator 1.

Another difference ensues from the fact that the closing wall 46 with passages 47 directs the flow in the oxic space 16 in analogy with the preceding reactor according to example 3.

In addition to the described functional parts all exemplifying embodiments use various, mostly not illustrated, supporting columns, supporting elements, and possibly further current design elements. In all embodiments it holds that the separation space in separator 1 essentially widens in the upward direction, and namely both above the level of withdrawal of thickened suspension, and underneath.

The method and apparatus for performing the method according to the invention are not limited to the described examples only, but comprise also all modifications that are obvious for those skilled in the art upon the basis of the described basic embodiments of the invention.

The upward widening separator 1 can contain, e.g., also a cylindrical or similar part, i.e. it need not widen continuously. Also the inner walls 29, 52, 53 can be performed in a similar way. Only the prevailing parts of the functional tubes, especially the collecting tubes 3, 4, 32, 35, 36, 57, 58, can be arranged at the walls of separator 1, whereas the remaining parts can be arranged inside or outside separator 1. However, it is important that at least the predominant part of collecting tubes 3, 35, 36 for the thickened suspension should be arranged at the outer wall or outer walls of the separation space or, possibly, in its outer boundary zones.

In addition to that the collecting tubes 3, 35, 36 for the thickened suspension are arranged with their functional parts at $\frac{1}{4}$ to $\frac{3}{4}$ of the height between the inlet 5, 38, 59 into the separation space and the level of withdrawal of purified liquid. Functional parts are understood to be the parts of collecting tubes 3, 35, 36 in whose holes 7, 37 the thickened suspension enters directly.

The collecting tubes 32, 57, 58 in the thickening space 31, 56 serve for withdrawal of the thickened suspension. They are preferably arranged roughly at the level of inlet 5, 38, 59 into the separation space, however, they can be also accommodated slightly above or under the same.

The method and the apparatus according to the present invention are intended in particular for the separation of flocculating suspension in the process of waste water treatment, and namely both for municipal or conurbation sewage and for smaller units, such as hotels or single houses. They are also suitable for treatment of waste water from industrial plants and mines, or from agricultural enterprises, such as liquid manure of farm animals.

The following is a list of reference numerals used in the drawings:

1 separator
2 outer wall of separation space
3 collecting tube of angular section for withdrawing the thickened suspension
4 collecting tube of triangular section for withdrawing liquid without suspension
5 inlet created by entrance to the separation space
6 holes in tube 4
7 holes in tube 3
8 discharge
9 overflow
10 water surface
11 pipe
12 re-circulation pump
13 cylindrical end piece
14 surface of sludge blanket
15 tank
16 oxic space
17 anoxic space
18 connection
19 partition wall separating the oxic space from the anoxic space
20 outlet of the re-circulation pump
21 bottom of tank
22 counter-cone
23 holes in the counter-cone
24 aeration element
25 inlet pipe of air
26 inlet of waste water
27 agitator
28 deflecting wall
C concentration of suspension at the inlet of separation space
$Q_o$ volume amount of water without suspension flowing out from the separation space
$Q_s$ volume amount of thickened suspension withdrawn from the separation space
$C_s$ concentration of withdrawn thickened suspension
$C_{ss}$ concentration of withdrawn thickened suspension in steady state

EXAMPLE 2

29 inner wall
30 upper edge of the inner wall
31 thickening space
32 collecting tube

EXAMPLE 3

33 inclined outer wall
34 inclined outer wall
35 collecting tube
36 collecting tube
37 aperture
38 inlet into separation space
39 rinsing pipes
40 rinsing pipes
41 holes in the rinsing pipe
42 collecting tubes for withdrawing liquid without suspension
43 collecting tubes for withdrawing liquid without suspension
44 inlet pipe for the inlet of pressure air
45 inlet pipe for the inlet of pressure air
46 closing wall
47 passages in the closing wall
48 holes in the collecting tube for withdrawal of liquid without suspension

EXAMPLE 4

50 outer wall
51 outer wall
52 inner wall
53 inner wall
54 upper edge of inner wall 52
55 upper edge of inner wall 53
56 thickening space
57 collecting tube of suspension
58 collecting tube of suspension
59 inlet into separator
60 openings in the collecting tubes 57 and 58
61 collecting tubes of water without suspension
62 collecting tubes of water without suspension
63 overflow
64 inlet pipe of pressure air
65 inlet pipe of pressure air
66 cleaning pipe
67 discharge tube of purified water (FIG. 8)

The invention claimed is:

1. Apparatus for separation of flocculating suspension by filtration in a fluidized layer of a sludge blanket comprising: an essentially upward widening separator having inclined outer walls, the inner volume of said separator containing a separation space and being provided with an inlet of liquid with suspension in a bottom part of said separator and means for withdrawal of liquid without suspension in an upper part of said separator, in the separation space, in operation, there is formed a fluidized layer of sludge blanket, above the surface of which purified water is located, thickened suspension being withdrawn from the separation space, wherein the separation space in the separator, at least in one place over the inlet into the separator and under the sludge blanket surface, is upwards suddenly widened, and at the level of this sudden widening at least one withdrawal spot of an excess thickened suspension, falling as density streams along at least one of said inclined outer walls from the fluidized layer of sludge blanket, is located inside the separation space in the separator.

2. Apparatus according to claim 1, wherein the separation space within the separator, in a bottom part of said separator, is limited at least in a part at least by one included inner wall; while a space between a bottom part of one of said outer walls and said one included inner wall creates a thickening space, whereas a gap between an upper edge of this inner wall and said one of said outer walls represents the place of the sudden widening and also the withdrawal spot of the excess thickened suspension from the separation space.

3. Apparatus according to claim 2, wherein the gap between the upper edge of the inner wall and said one of said outer walls creates an inlet to the thickening space that is provided with a means for withdrawing the excess thickened suspension in a bottom part of said thickening space.

4. Apparatus according to claim 2, wherein the inclined outer walls of the separator include an angle in the withdrawal zone of the thickened suspension and an upper part above this level is more inclined than a bottom part below this level.

5. Apparatus according to claim 4, wherein the angle of said one included inner wall is within the range of 52° to 60°, whereas a bottom part of one of said outer walls extending adjacent said one included inner wall has an angle within the range of 30° to 40°.

6. Apparatus according to claim 1, wherein in the withdrawal spot a means for withdrawing thickened suspension is located and said means for withdrawing thickened suspension comprises a perforated collecting tube and the sudden widening of the separation space in this place includes a set back section relative to the outer walls; and said collecting tube for withdrawing the excess thickened suspension is positioned at said set back section and arranged such that withdrawing the excess thickened suspension is performed on a side of the collecting tube that is upward facing.

7. Apparatus according to claim 1, wherein an inlet area of said inlet to the separation space represents more than 3 percent and less than 6 percent of the surface of the separation space at the level of withdrawal of liquid without suspension.

8. Apparatus according to claim 1, wherein the area of the separation space immediately under the withdrawal level of the excess thickened suspension represents more than 20 percent, and immediately above the level of the excess thickened suspension removal represents less than 70 percent of the surface of the separation space at the withdrawal level of liquid without suspension.

9. Apparatus according to claim 1, wherein both the level of inlet to the separation space and the level of withdrawing the liquid without suspension are at vertical distance of more than one meter from the withdrawal level of thickened suspension.

10. Apparatus according to claim 1, wherein the height of the withdrawal level of the excess thickened suspension above the level of inlet into the separation space is in the range from ¼ to ¾ of the height of the level of withdrawing the liquid without suspension above the inlet level into the separation space.

11. Apparatus according to claim 1, comprising functional tubes, at least one functional tube from a group created by collecting tubes of the excess thickened suspension, collecting tubes for withdrawing the excess thickened suspension, collecting tubes for withdrawing liquid without suspension, discharge tubes, inlet pipes of pressure air and the rinsing tubes, and at least one of the group of functional tubes also forming part of a supporting structure of the outer walls of the separation space.

12. Apparatus according to claim 1, wherein the angle of an upper positioned one of said inclined outer walls is within a range of 52° to 60°.

13. Method of separating suspension for treatment of waste water comprising introducing the suspension including wastewater into a separator containing a fluidized sludge blanket, wherein a flocculating suspension is separated from a liquid including said wastewater by filtration in a fluidized layer of a sludge blanket wherein flocks are created from separated suspension and fluidization is maintained by a rising stream of liquid, while liquid with suspension enters the fluidized layer from the bottom and the liquid freed from suspension is discharged above the surface of the sludge blanket represented by an interface between the fluidized layer and the liquid without suspension, and a velocity of upward flow in the fluidized layer decreases essentially in the upward direction, wherein there is formed an upper partially fluidized sludge blanket and bottom fully fluidized sludge blanket, wherein the partially fluidized sludge blanket agglomerates of thickened suspension are established which move downward along an inclined boundary resulting in a concentration of the thickened suspension into density streams which are withdrawn, and in the fully fluidized sludge blanket liquid flow is distributed into the partially fluidized sludge blanket, and wherein excess thickened suspension is withdrawn at a side boundary of the fluidized layer at an interface between said upper partially fluidized sludge blanket and said bottom fully fluidized sludge blanket.

14. Method according to claim 13, characterised in that the separated thickened suspension removed from the fluidized layer is forcibly moved downward while getting further thickened.

15. Method according to claim 14, characterised in that the volume of withdrawn thickened suspension makes 1.5 multiple to 3 multiple of the volume of water without suspension withdrawn above the surface of sludge blanket.

16. Method according to claim 13, wherein if a concentration of inflowing suspension exceeds 1 kg of dry matter per cubic meter, the velocity of upward water flow immediately above the surface of sludge blanket is in the range of 1.6 to 2.2 meters per hour.

17. Method according to of claim 16, characterised in that the volume of withdrawn thickened suspension makes 1.5 multiple to 3 multiple of the volume of water without suspension withdrawn above the surface of sludge blanket.

18. Method according to claim 13, characterised in that a water flow velocity at the entrance to the sludge blanket is within the range of 2 to 6 cm per second.

19. Method according to claim 18, characterised in that the volume of withdrawn thickened suspension makes 1.5 multiple to 3 multiple of the volume of water without suspension withdrawn above the surface of sludge blanket.

20. Method according to claim 13, characterised in that the volume of withdrawn thickened suspension makes 1.5 multiple to 3 multiple of the volume of water without suspension withdrawn above the surface of sludge blanket.

21. Apparatus for separation of flocculating suspension by filtration in a fluidized layer of a sludge blanket, comprising:
a separator having at least one inclined outer wall defining an inner volume of said separator, which inner volume defines an interior, upwardly diverging separation space, said separator further including an inlet at a bottom part of said separation space for receiving liciuid with suspension into the separation space, and said separator having an upper part with an outlet for withdrawal of liquid without suspension from the separation space,
the upwardly diverging separation space of said separator being configured such that there is a lowering of velocity in liquid traveling upward in said separation space such that in operation there is formed a partially fluidized sludge blanket layer above a fully fluidized sludge blanket layer, said partially fluidized sludge blanket having an upper surface and above said upper surface liquid without suspension is located for removal through said outlet, and within the separation space there is provided at least one thickened suspension withdrawal spot for removal of thickened suspension that is falling as density streams along said at least one inclined outer wall, and said at least one withdrawal spot being positioned at a level of said separator which is at an interface between the upper positioned partially fluidized sludge blanket and the bottom positioned fully fluidized sludge blanket.

22. Apparatus according to claim 21 wherein the inner volume of said separator is defined by an upper inclined outer wall, a lower inclined outer wall and a step region extending radially out from the lower inclined outer wall to said upper inclined outer wall, and wherein the withdrawal spot for thickened suspension is at said step region such that the thickened suspension, falling as density streams, travels to the withdrawal spot at said step region.

23. Apparatus according to claim 22 further comprises a thickened suspension collecting tube which has openings which provide multiple withdrawal spots for the thickened suspension and which collecting tube is positioned at said step region.

* * * * *